United States Patent [19]

Brey et al.

[11] Patent Number: 4,665,546
[45] Date of Patent: May 12, 1987

[54] MODULAR DISTRIBUTION FRAME ASSEMBLY

[75] Inventors: William A. Brey, Schaumburg; Steven R. Hilbert, Elgin, both of Ill.

[73] Assignee: Reliance Comm/Tec Corporation, Chicago, Ill.

[21] Appl. No.: 711,384

[22] Filed: Mar. 13, 1985

[51] Int. Cl.$^4$ .......................... H04M 3/00; H04Q 1/14
[52] U.S. Cl. ...................................... 379/327; 361/428
[58] Field of Search ............... 179/98, 91 R; 361/119, 361/428; 339/18 R, 126 R

[56] References Cited

U.S. PATENT DOCUMENTS

| | | | |
|---|---|---|---|
| 4,002,856 | 1/1977 | Sedlacek et al. | 179/98 |
| 4,117,273 | 9/1978 | Gautier et al. | 179/98 |
| 4,160,880 | 7/1979 | Brey | 179/98 |
| 4,204,095 | 5/1980 | De Luca et al. | 179/98 |
| 4,260,856 | 4/1981 | Saligny | 179/98 |
| 4,536,052 | 8/1985 | Baken et al. | 179/98 |

Primary Examiner—James L. Dwyer
Attorney, Agent, or Firm—Michael M. Rickin

[57] ABSTRACT

A modular distribution frame assembly for carrying telephone line terminal and protection blocks in a substantially factory-prewired condition. The frame has a base for securing to a floor support and a telescopic upper end for securing to an overhead support. The protection blocks are mounted on one side of the frame in a vertical array. The line terminal blocks are mounted on the other side of the frame in horizontal arrays. The frame includes horizontal channels which open only to the side on which the terminal blocks are mounted. The arrays of terminal blocks are mounted above and below each channel. Any one of the protection blocks may be connected to any one of the terminal blocks in one of the arrays. The horizontal channel may be used to receive wires which are used to jumper between the array of line terminal blocks which are connected to the protection blocks and the other array of terminal blocks mounted adjacent the channel.

17 Claims, 7 Drawing Figures

MODULAR DISTRIBUTION FRAME ASSEMBLY

BACKGROUND OF THE INVENTION

1. Field of the Invention.

This invention relates to a modular distribution frame assembly for use as a telephone line variable cross-connect system and more particularly to an assembly structure which allows terminal blocks to be arranged on one side of the frame in a manner such the necessary interconnections there between may be accomplished within a localized area referred to hereinafter as a "subzone".

2. Description of the Prior Art.

Modular distribution frames are well known in the art. One such example is described in U.S. Pat. No. 4,002,856 entitled "Modular Distribution Frame Assembly which issued on Jan. 11, 1977 in the name of William S. Sedlacek at el and which is assigned to the same assignee as is the present invention. That patent will be referred to hereinafter as the '856 patent. In order that a better understanding of our invention be obtained and as our invention is in some respects similar to the modular frame assembly described in the '856 patent, FIG. 1 herein shows a perspective view of the prior art assembly described in that patent.

Referring now to FIG. 1, there is seen the modular distribution frame system of the '856 patent designated generally by reference numeral 10. The modular distribution frame system 10 includes a plurality of modular frame assemblies 12, 13 and 14 positioned vertically side by side in a row. While only three modular distribution frame assemblies are shown, it will be understood that any number of frames may be incorporated.

The modular frame assembly 12 has a base structure 16 for securing to a floor support 17. The floor support 17 is part of a central office exchange and the plurality of subscriber or trunk lines coming into the exchange are directed through a plurality of subterranean cables 18. The cables 18 are divided into groups 19, 20 and 21 which extend upwardly through the support floor 17 and into the frame structure of each of the modular distribution frames 12, 13 and 14, respectively. The incoming subscriber lines can be introduced from an overhead cable if desired. All of the modular frame assemblies are substantially identical in construction and, therefore, only the frame 12 will be described in detail. The modular frame assembly 12 includes a vertical frame 22 preferably formed of metallic angle iron, bar stock and channel stock, as desired. Preferably the components forming the frame are welded together and the sharp edges and welds are finished to provide smooth surfaces at all corners. This preferably is accomplished in an assembly line production at the place of manufacture rather than fabricating the support frame on the site where it is to be used. The upper end of the frame 22 is provided with a telescopic section 23 and is adjusted in the vertical direction to engage a suitable upper support, not shown in the drawing.

A plurality of vertically aligned horizontally spaced apart protector blocks 26L and 26R are secured to the far side of the frame while a plurality of vertically aligned horizontally spaced apart line terminal blocks 27L and 27R are secured to the near side of the frame. The protector blocks 26L and 26R have a multitude of protector elements 28 inserted into receptacles therein. The protector elements 28 on the two vertical arrays of protector blocks 26L and 26R are interconnected with appropriate contact positions of the line terminal blocks 27L forming the vertical array to the left of the main vertical open column 32 by means of interconnecting cables 29. The cables 29 preferably have at least one end thereof provided with a mulit-position connector 30 which mates with a matching connector 31. The other end of the connector cables 29 may be wired directly to line terminal block contact positions either by wirewrap or quick-clip connect method, or other suitable means, or may be connected to multi-position connectors and mated with matching connectors which can be mounted on the back side of the line terminal blocks 27L (not shown). The matching connectors in turn have been interconnected with appropriate contact positions of the line terminal blocks 27L. In essence, all incoming conductor pairs wired through protector elements 28 are now "protected" and these "protected pairs" have now been transferred to contact positions on the line terminal blocks 27L forming the vertical array to the left of the main vertical open column 32.

In a similar fashion, except not wired through any protector elements 28, the central office distribution lines (cables) 41 are routed into the basic modular frame 12 at the top via overhead cable racks (not shown) and connected by means of multi-position connectors 30 and 31 or directly wired to appropriate contact positions on the line terminal blocks 27R forming the vertical array to the right of the main vertical open column 32.

It is within this main vertical open column area 32 that most of all subsequent jumper wire 36 used will be stored while providing the desired variable interconnection between appropriate "protected pairs" appearing at contact positions on the line terminal blocks 27L on the left and related central office distribution lines (cables) 41 appearing at contact positions on the line terminal blocks 27R on the right.

The main vertical open column 32 is formed by a plurality of spaced apart retainer rings 33. The retainer rings 33 have openings 34 formed by closely spaced apart terminating ends of the retainer rings so that jumper wires 36 can be easily inserted into the ring in a vertical fashion as seen in FIG. 1. The jumper wires 36 are connected to appropriate terminating pins of the line terminal blocks 27L and 27R of one distribution frame assembly and can be connected to another appropriate pin of another terminal block of another distribution frame assembly. Therefore, the jumper wires 36 may travel from one frame to another frame along an upper support or tray as indicated generally by reference number 38 or along a lower support or tray, as indicated generally by reference number 39. The base structure of each of the modular distribution frame assembly 12, 13 and 14 form wire run support trays on both sides thereof and designated generally by reference numerals 39 and 40. It will be seen in the system drawing of FIG. 1 that a plurality of input cables 41 extend fromthe upper end of each of the modular distribution frame assemblies and are directed in an overhead fashion from appropriate terminating ends at a central office equipment block.

The frame assembly of the '856 patent has the advantages of being modular, essentially assembled in the factory prior to installation and relatively easy to install at the central office. While that assembly has both an upper and lower jumper support or tray to allow jumper wires to travel from one frame to another frame, it has been found that under certain circumstances the upper and lower trays may become congested by having a large number of jumpers therein. It was then recognized that it would be desirable to provide in a single modular frame, means by which such jumper congestion could be avoided if desired while at the same time preserving all of the advantages present in the frame assembly of the '856 patent.

SUMMARY OF THE INVENTION

A modular distribution frame assembly having a vertically upstanding frame, a base and a top. The base and the top are securable to subjacent and overhead supports, respectively, and one of them is vertically extensible.

The frame also includes at least one horizontal channel which opens only to one side of the frame. The channel is capable of receiving jumper wires therein. First and second arrays of terminal block are mounted above and below the channel opening. The first array of terminal blocks having terminals for connection to a vertical array of protector blocks. The frame allows that connection to be routed between any one of the protector blocks and any one of the first terminal blocks. The protector blocks are adapted to be connected to subscriber lines. The second terminal blocks have terminals for connection to central office lines. The jumpers connect a terminal of the first blocks with a terminal of the second blocks.

DESCRIPTION OF THE PREFERRED EMBODIMENT

Figure 1:
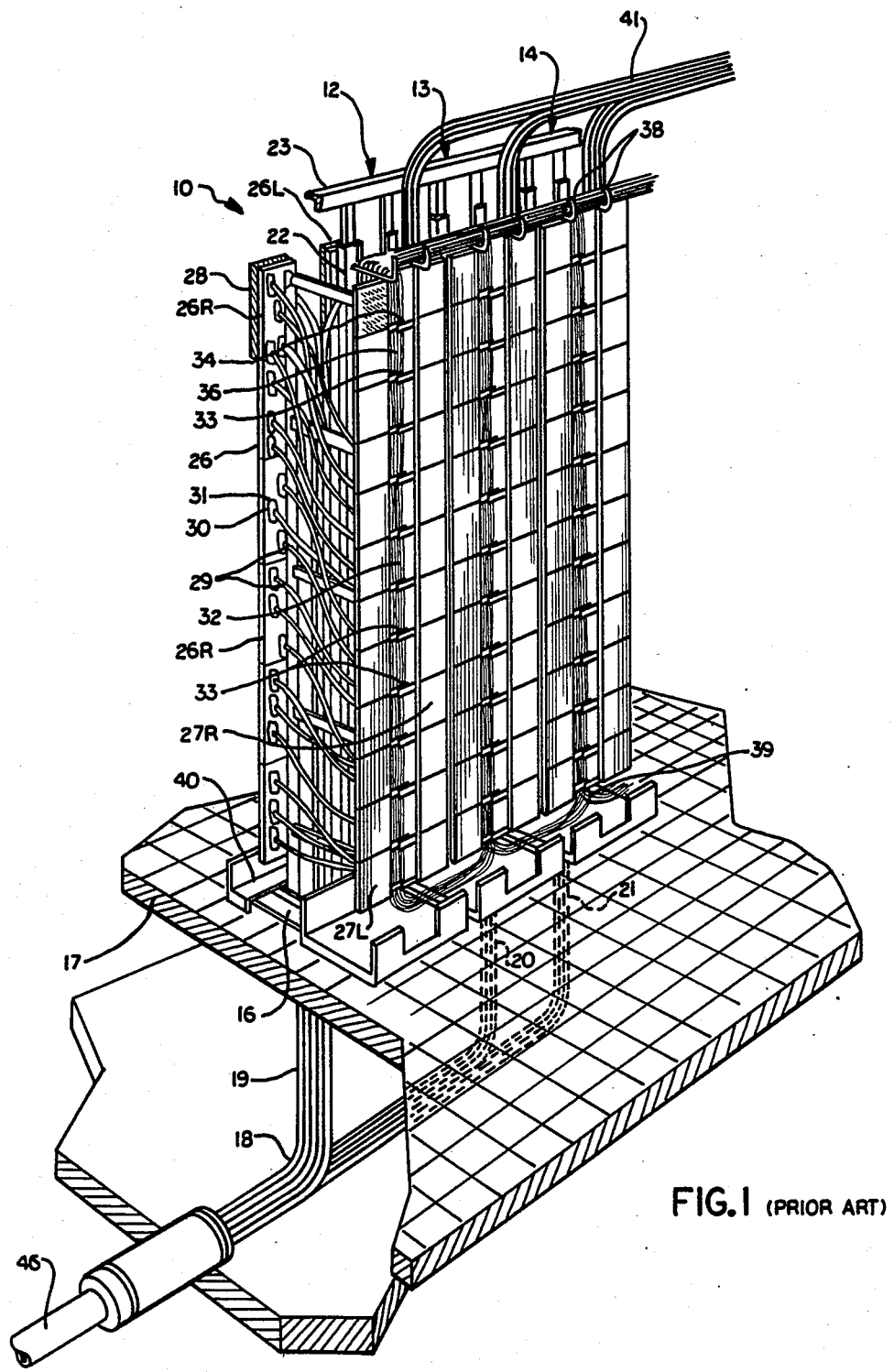
FIG. 1 is a perspective view of a plurality of modular distribution frame structures of the prior art.
Figure 2:
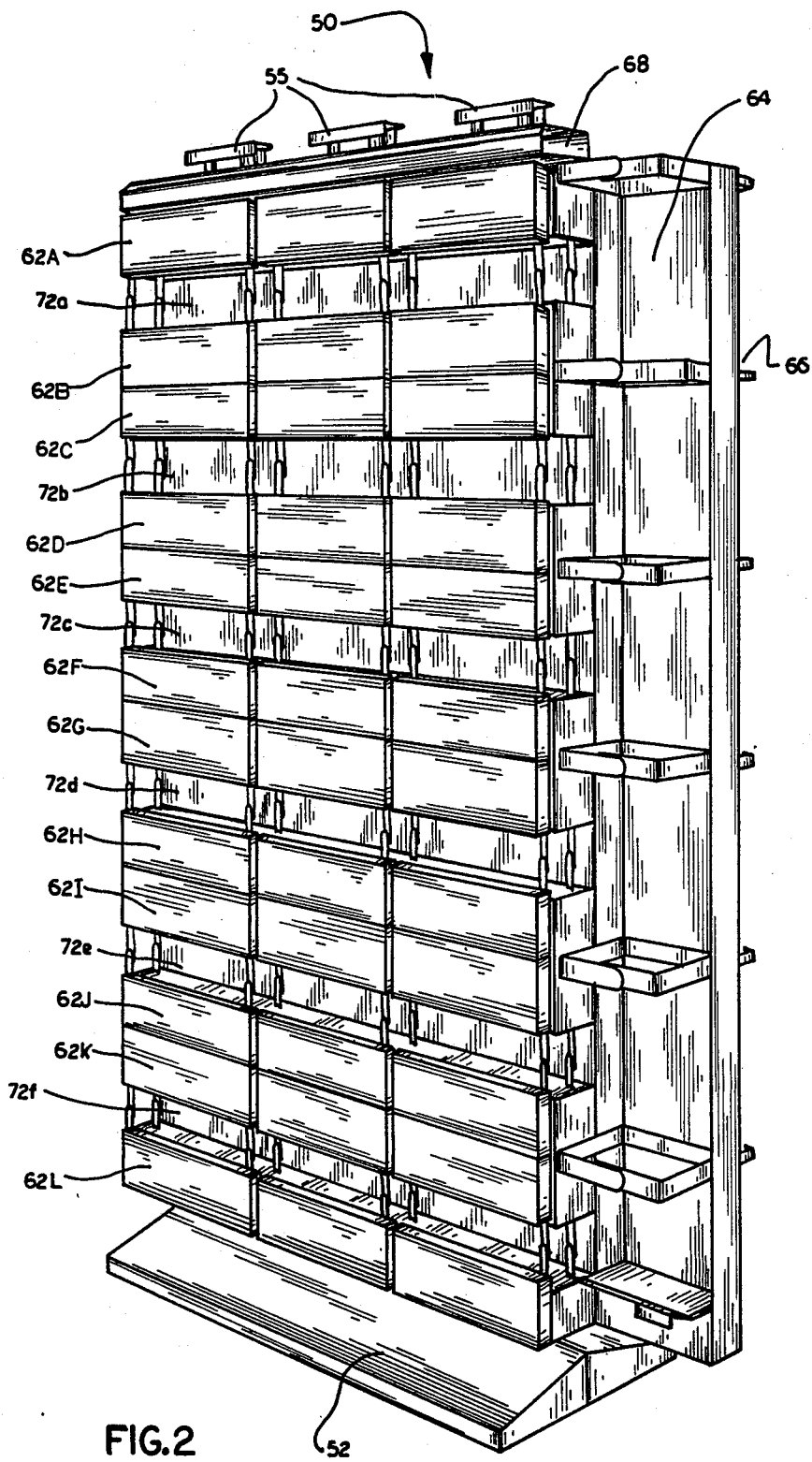
FIG. 2 is a perspective view of the modular distribution frame assembly of the present invention.

Referring now to FIG. 2 there is shown a perspective view of a single modular distribution frame assembly constructed in accordance with the principles of this invention and designated generally by reference numeral 50. While only a single assembly 50 is shown in FIG. 2 it will be understood any number of assemblies 50 may be positioned vertically side by side in the manner to be described hereinafter. As the frame assembly of the present invention is similar in many respects to that shown in the '856 patent, many of the items shown in FIG. 1 have not been shown in FIG. 2 for ease of illustration. To the extent items described hereinafter are said to be not shown in FIG. 2 they are identical to similarly described items shown in FIG. 1 unless otherwise stated.

Figure 6:
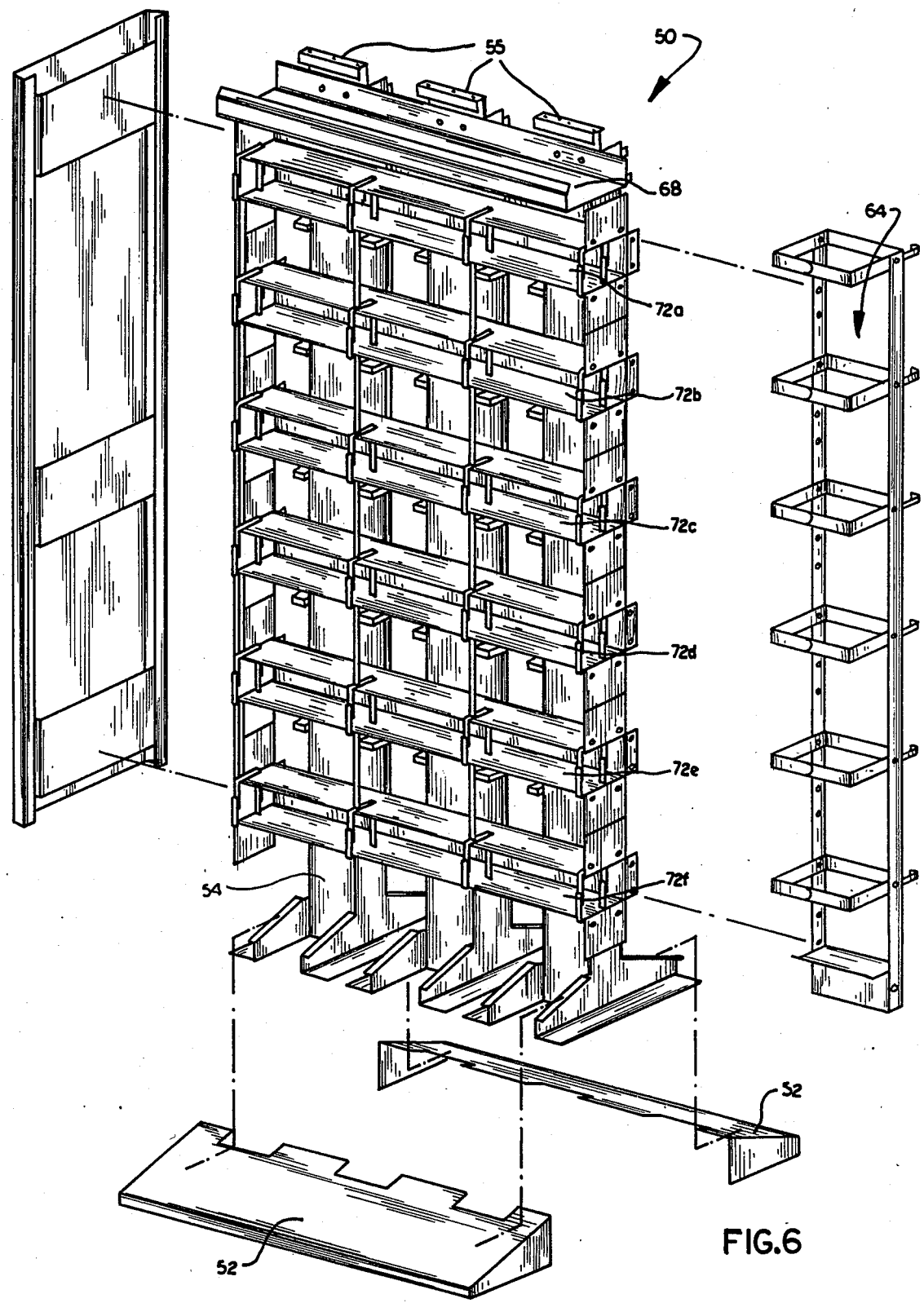
FIG. 6 is an exploded perspective of the frame assembly of the present invention.

The frame assembly 50 generally has a base structure 52 for securing to a floor support (not shown) which is part of a central office exchange. The assembly 50 also includes a vertical frame 54 (see FIG. 6). The frame 54 includes three vertical channels, 56a, b, c, which are secured to the frame in a manner such that the channels open to the far side of the frame. (see FIG. 4). The plurality of subscriber or trunk lines coming into the exchange are directed through a plurality of subterranean cables (not shown). The cables are divided into three groups (not shown) which extend upwardly through the floor support and into a respective one of each of channels 56a, b, and c. The upper end of the frame 54 is provided with a telescopic section 55 and is adjusted in the vertical direction to engage a suitable upper support (not shown).

A plurality of vertically aligned horizontally spaced apart protector blocks 58L and 58R, each having a multitude of protector elements (not shown) inserted therein, are secured to the left and right edges of each of channels 56a, b, c. In a typical arrangement for assembly 50, each of the three channels may have attached thereto up to six (6) blocks on each of its edges. Each block is typically arranged to protect 100 incoming pairs so that each channel is capable of protecting up to 1200 pairs and assembly 50 is capable of protecting up to 3600 pairs in total.

A plurality of horizontally aligned vertically spaced apart line terminal blocks 62A to 62L are secured to the near side of the frame assembly. In a typical arrangement for assembly 50 there may be up to 12 rows of terminal blocks having up to three (3) blocks in each row or 36 terminal blocks in total. Each terminal block has 500 contact positions on its rear face so that the 36 terminal blocks are capable of connecting up to 9000 pairs of wires.

In the modular frame assembly 10 of FIG. 1 the central office distribution cables 41 are routed into the basic modular frame at the top. Those cable pairs are routed along the outside edge of that portion of each modular frame assembly to which the protector blocks are attached. Also as shown in FIG. 1, assembly 10 has a vertical open column 32 associated with each modular assembly 12, 13, 14. As described it is in this column 32 wherein most of the jumper wiring will be stored. The column 32 lies between the terminal blocks 27L and 27R.

Figures 4, 5:
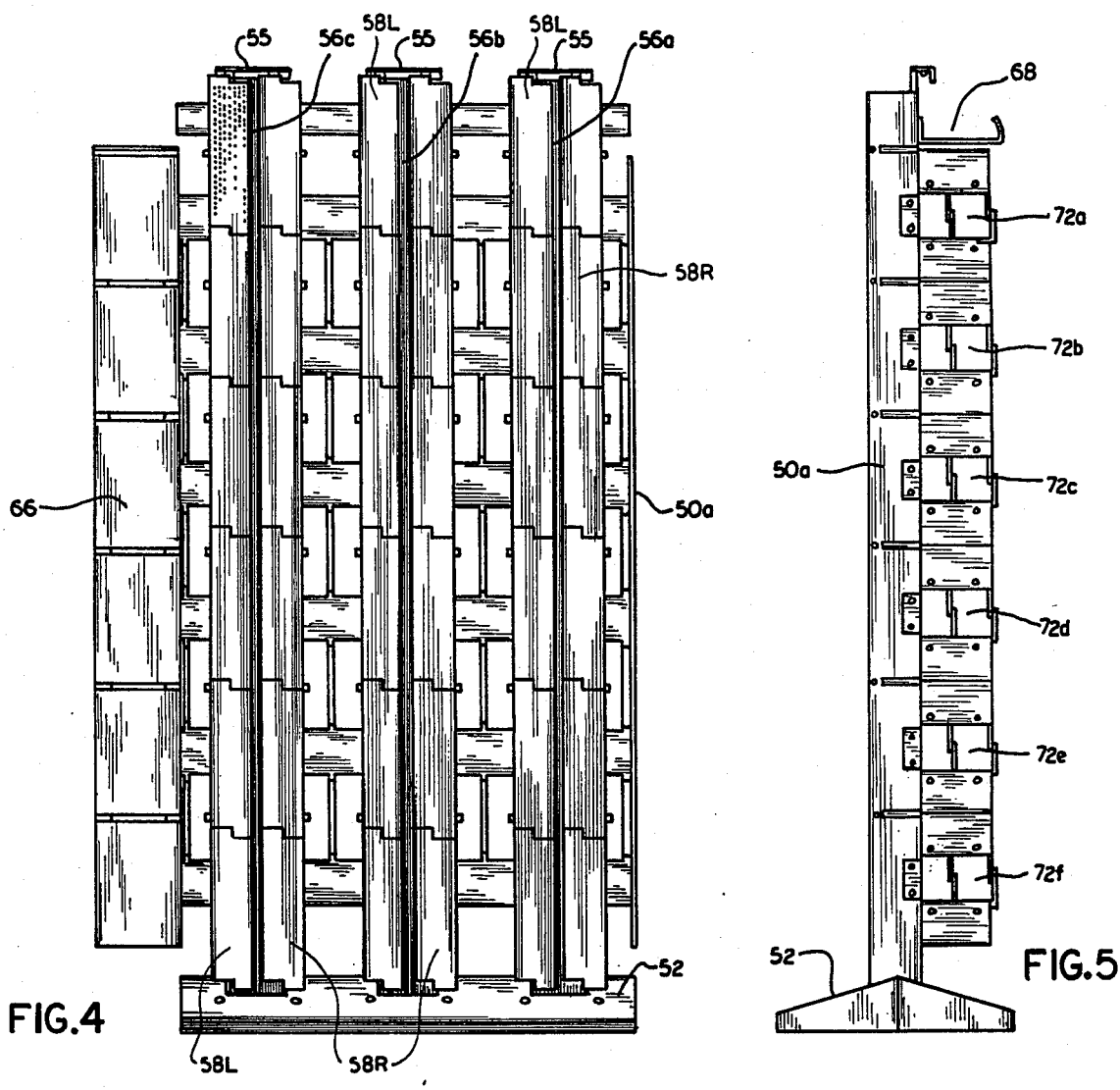
FIG. 4 is a back view of the frame assembly shown in FIG. 2.
FIG. 5 is a left side view of the frame assembly of FIG. 2.

The assembly of the present invention also has a single main vertical jumper channel 64 which is attached to the righthand edge of the near side. As is best seen in FIG. 4, there is attached to the back of vertical jumper channel 64, i.e. on the far side of assembly 50, a channel 66 through which the central office distribution cables (not shown) are routed. Thus in the modular frame assembly 50 the central office cables are routed along the side of the assembly.

Assembly 50 further includes an upper horizontal tray or trough 68 known as the express trough which is used for routing of jumper wires. Assembly 50 also includes on the near side a multiplicity of horizontally arranged jumper channels 72. In a typical assembly 50 there are six (6) such channels designated respectively from top to bottom as 72a, b, c, d, e, f. As can be seen most clearly in FIG. 2, channel 72a is separated from top trough 68 by a single row of line terminal blocks 62A. Channels 72b, c, d, e, and f are separated from each other by two rows of such blocks. Channel 72f is separated from the base 52 of the assembly by a single row of such line terminal blocks. Also as can be most clearly seen in FIG. 2, each of horizontal jumper channels 72a, b, c, d, e, f includes an opening at both ends, the opening at the end adjacent to vertical jumper channel 64 providing access between each of the multiple horizontal channels and the single vertical channel.

As in the frame assembly described in the '856 patent the incoming cable pairs are wired directly to the protected blocks on the far side which are associated with those pairs. Also as described in the '856 patent the central office cable pairs are wired directly to those ones of the line terminal blocks which are associated with those pairs. Those line terminal blocks will be referred to hereinafter as the "inside plant" blocks.

Figure 3:
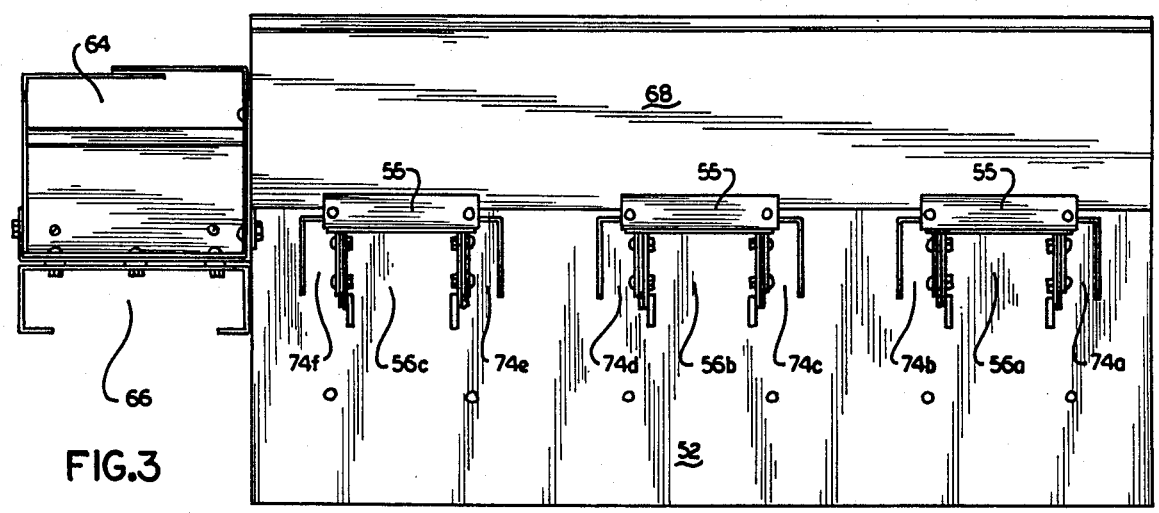
FIG. 3 is a top view of the frame assembly shown in FIG. 2.

As further described in the '856 patent, the protector blocks on the far side of the frames assembly are interconnected with the appropriate contacts of those ones of the line terminal blocks on the near side which are associated with the protected pairs. Those line terminal blocks are not the inside plant blocks and will be referred to hereinafter as the "outside plant" blocks. These interconnections between the protected blocks and the outside plant blocks are made by cables which may be connected between the blocks in the manner described in the '856 patent. Those cables will be referred to hereinafter as the "tie" cables. The tie cables may be routed between the protector blocks and the outside plant blocks along the six channels designated in FIG. 3 as 74a to 74f. Tie cable routing channels 74a, 74b are located on either side of channel 56a and are therefore associated with the protector blocks mounted thereon. Similarly, the cable channels 74c, 74d are located on either side of channel 56b; and the cable channels 74e, 74f are located on either side of channel 56c and are associated with the respective protector blocks mounted thereon. The tie cables may also be routed directly between a protector block and an outside plant block which is located on the assembly in a row which is directly opposite the protector block. As a result of the tie cables all of the incoming cable pairs wired through the protected blocks have been transferred to contact positions on the appropriate ones of the outside plant line terminal blocks. Therefore protected pairs appear at the outside plant blocks.

It should be appreciated that it is the ability to route the tie cables along the channels 74a to 74f which allows frame assembly 50 to provide certain advantages not found in prior art frame assemblies. Assembly 50 does not require that a protected block be directly connected to the outside plant block which is directly opposite to it on the frame. Therefore a protected block may be connected to an outside plant block which is located anywhere on the frame assembly. When a number of assemblies are connected together this ability to route the tie cables to other than the outside plant blocks directly opposite the protected blocks allows a protected block to be connected to an outside plant block which may not even be located on the same assembly.

As further described in the '856 patent, jumper wires are then used to interconnect various ones of the protected pairs on the outside plant blocks with the appropriate ones of the central office pairs appearing at contact positions on the inside plant line terminal blocks. In the single assembly of the present invention the jumper wires may then be routed along the horizontal channels 72a to 72f, and also along the vertical jumper channel 66, if needed. Express trough 68 is used for the routing of jumper wires only when a number of assemblies 50 are connected together. The routing of the jumper wires depends to some extent on the manner in which the inside plant and outside plant line terminal blocks are arranged with respect to each other on the near face of assembly 50.

In accordance with the present invention the outside and inside plant blocks may be arranged with respect to each other in a manner which allows for maximum usage of the horizontal jumpe channels 72a to 72f. In that arrangement each horizontal jumper channel has associated therewith a row of outside plant blocks and a row of inside plant blocks. For example, the outside plant blocks may be located in the row which is directly above each horizontal channel and the inside plant blocks may then be located in the row which is directly below each horizontal channel. When the blocks are arranged as described above, rows 62A, 62C, 62E, 62G, 62I and 62K contain outside plant blocks and rows 62B, 62D, 62F, 62H, 62J and 62L contain inside plant blocks. This arrangement of a single row of outside plant blocks and a single row of inside plant blocks in association with a single horizontal jumper channel will be referred to hereinafter as a "subzone." It should be appreciated that it is the ability to route tie cables to other than an outside plant block which is directly opposite a protected block which allows subzones to exist in assembly 50. For ease of explanation, it will be assumed hereinafter that in each subzone the row of outside plant blocks are above the jumper channel.

Figure 7:
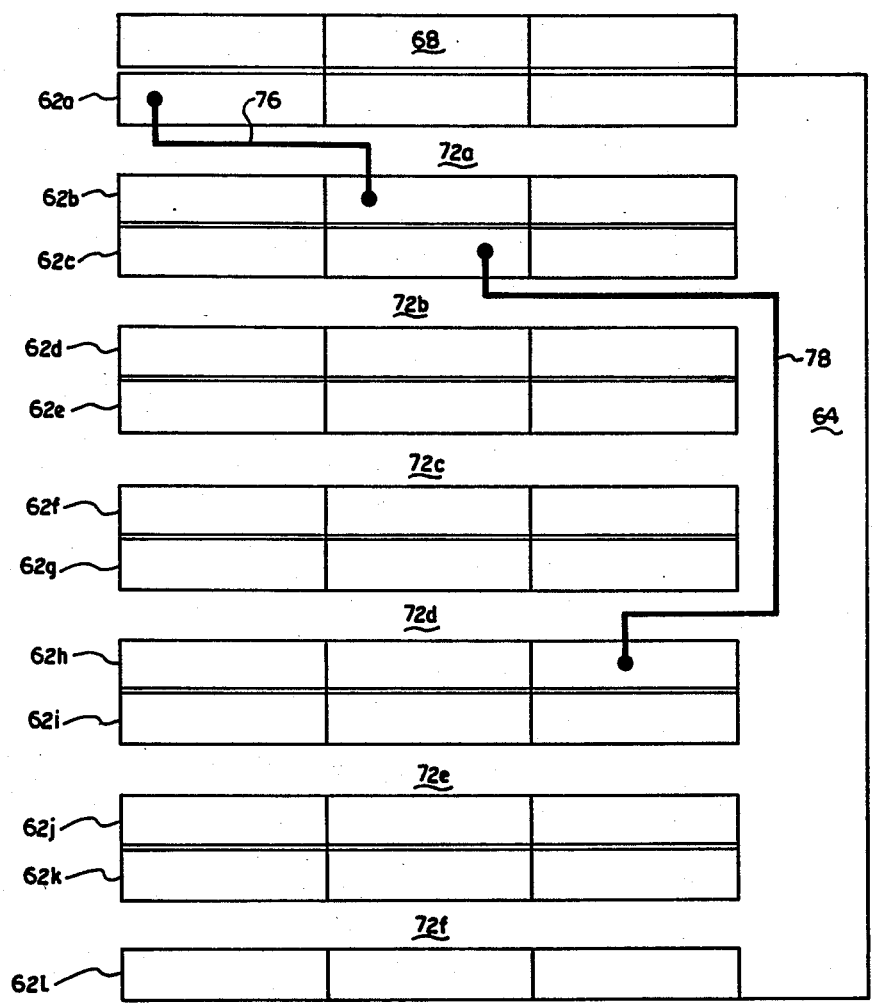
FIG. 7 is a schematic diagram of the frame assembly of the present invention showing a typical arrangement of terminal blocks and jumper wires thereon.

Referring now to FIG. 7 there is shown a schematic illustration of the single frame assembly 50 shown in FIGS. 2 to 6. In assembly 50 the outside plant blocks and inside plant blocks in rows 62A, 62B form a first subzone; the outside plant blocks and inside plant blocks in rows 62C, 62D form a second subzone; the outside plant blocks and inside plant blocks in rows 62E, 62F form a third subzone; the outside plant blocks and inside plant blocks in rows 62G, 62H form a fourth subzone and so on. For ease of illustration the incoming central office cables have not been shown.

In order to illustrate the various possible routes for the jumper wires in assembly 50, two such jumper wires are shown. Jumper wire 76 connects one of the outside plant blocks in the first subzone with one of the inside plant blocks in the same subzone. As can be seen, the routing of jumper wire 76 takes place entirely in the horizontal channel 72a associated with that subzone. Jumper wire 78 connects one of the outside plant blocks in the second subzone with one of inside plant blocks in the fourth subzone. As can be seen jumper wire 78 is first routed along the horizontal channel 72b associated with the second subzone until the vertical channel 64 is reached. Jumper wire 78 is then routed along channel 64 until the horizontal channel 72d associated with the fourth subzone is reached. Jumper wire 78 is then routed along that channel until the selected one of the inside plant blocks to which it is to be connected to is reached.

There has been shown in FIG. 7 only two of the various possible routes for the jumper wires in assembly 50. It should be appreciated that by properly planning the subzones to which the protected pairs and central office pairs are to be connected to, that many of the jumper wires can be arranged to be routed solely within a single subzone. Therefore, the providing of horizontal jumper channels can allow for minimization of the overall length of jumper wires.

It should be appreciated that while only one modular distribution frame assembly has been shown in FIGS. 2 to 7 that any number of such assemblies may be connected together. The number of assemblies 50 to be interconnected depends on the particular requirements of the central office in which the modular assembly is to be installed. For example, two assemblies may be interconnected in a manner such that a single vertical jumper channel 64 and channel 66 would be in the middle between the two assemblies. It should also be appreciated that in such an interconnection protected blocks on one assembly may be connected by tie cables to outside plant blocks on the other assembly. As described previously, assembly 50, whether used along or in combination with one or more other assemblies 50, does not require that the tie cables be routed only between a protected block and the outside plant block opposite thereto. Thus, in a system comprised of a number of assemblies 50, the associated subzone for protected pairs could reside on an assembly which need not be the same assembly on which the protected blocks are located.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

The invention is claimed as follows:

1. A modular distribution frame assembly comprising:
   (a) a vertically upstanding frame having two sides, one of said sides for mounting only terminal blocks thereon, the other of said sides for mounting only protector blocks thereon;
   (b) a base structure;
   (c) a top structure, said base and top structures having means for securement to a subjacent and overhead supports, respectively, at least one of said structures being vertically extensible to accommodate varying spacings between said subjacent and overhead supports;
   (d) at least two horizontal channels included in said frame, each of said channels opening only to said frame one side, each of said channels capable of receiving jumper wires therein;
   (e) first and second horizontal arrays of said terminal blocks mounted on said frame one side and associated with one of said horizontal channels, said first horizontal array being mounted above said one horizontal channel, said second horizontal array being mounted below said one horizontal channel;
   (f) third and fourth horizontal arrays of said terminal blocks mounted on said frame one side and associated with the other of said horizontal channels, said third array being mounted above said other horizontal channel and said fourth array being mounted below said other horizontal channel;
   (g) a first subzone formed by said one horizontal channel and said first and said second horizontal arrays, a second subzone formed by said other horizontal channel and said third and said fourth horizontal arrays, said first terminal blocks and said third terminal blocks having terminals thereon for electrical connection to said protector blocks, said frame allowing said electrical connection to be routed between any one of said protector blocks and any one of said first and third terminal blocks, said protector blocks being adapted for electrically conductive connection to subscriber lines, said second and said fourth terminal blocks having terminals thereon for electrical connection to central office lines, said first subzone allowing jumper wires to be routed between a selected terminal of any one of said first terminal blocks and a selected terminal of any one of said second terminal blocks, said second subzone allowing jumper wires to be routed between a selected terminal of any one of said third terminal blocks and a selected terminal of any one of said fourth terminal blocks.

2. The modular distribution frame assembly of claim 1 wherein said frame other side includes at least one vertically upstanding channel upon which said protector blocks may be mounted.

3. The modular distribution frame assembly of claim 2 wherein one of the sides of said vertically upstanding channel includes means for routing said electrical connection between any one of said protector blocks and any one of said first terminal blocks and any one of said third terminal blocks.

4. The modular distribution frame assembly of claim 3 wherein said protector blocks are mounted on said at least one vertically upstanding channel.

5. The modular distribution frame assembly of claim 1 wherein said frame includes at one end thereof a vertically upstanding member having a first channel opening to said one side, said at least two horizontal channels opening to said first channel.

6. The modular distribution frame assembly of claim 5 wherein said vertically upstanding member includes a second channel opening to said frame other side, said second channel being back to back to said first channel.

7. The modular distribution frame assembly of claim 1 further including a vertically upstanding member having a first channel adjacent to one end of said at least two horizontal channels and opening to said frame one side, said at least two horizontal channels having openings in that end allowing access therefrom to said vertically upstanding member first channel, said vertically upstanding member first channel capable of receiving jumper wires therein thereby allowing a selected terminal of any one of said first terminal blocks to be connected with a selected terminal of any one of said fourth terminal blocks and a selected terminal of any one of said third terminal blocks to be connected with a selected terminal of any one of said second terminal blocks.

8. The modular distribution frame assembly of claim 1 wherein said one horizontal channel is located on said frame one side a predetermined distance from said top structure such that said first horizontal array is the only array of said terminal blocks which can be mounted between said one horizontal channel and said top structure.

9. The modular distribution frame assembly of claim 8 wherein said other horizontal channel is located on said frame one side a predetermined distance from said base structure such that said fourth horizontal array is the only array of said terminal blocks which can be mounted between said one horizontal and said base structure.

10. The modular distribution frame assembly of claim 2 wherein said protector blocks are mounted on said at least one vertically upstanding channel in a vertical array which extends from the bottom to the top of said frame other side.

11. A modular distribution frame assembly comprising:
   (a) a vertically upstanding frame having two sides, one of said sides for mounting only terminal blocks thereon, the other of said sides for mounting only protector blocks thereon;

(b) a base structure;

(c) a top structure, said base and top structures having means for securement to a subjacent and overhead supports, respectively, at least one of said structures being vertically extensible to accommodate varying spacings between said subjacent and overhead supports;

(d) a predetermined number greater than one of horizontal channels included in said frame, each of said channels opening only to said frame one side, each of said channels capable of receiving jumper wires therein;

(e) a predetermined number of horizontal arrays of said terminal blocks mounted on said frame one side, said predetermined number of arrays being twice that of said predetermined number of horizontal channels, said predetermined number of horizontal arrays being arranged in pairs, each of said pairs being associated with the respective one of said predetermined number of horizontal channels, one array of each of said pairs being mounted on said frame one side above its associated horizontal channel, said terminal blocks of that array having terminals thereon for electrical connection to said protector blocks and the other array of each of said pairs being mounted on said frame one side below its associated horizontal channel, said terminal blocks of that array having terminals thereon for electrical connection to central office lines; and (f) a predetermined number of subzones formed by said predetermined number of said horizontal channels and said associated pairs of said terminal blocks horizontal arrays, said frame allowing said electrical connection between said protector blocks and said terminals in said terminal blocks of said above array of each of said pairs to be routed between any one of said protector blocks and any one of said terminals of said terminal blocks in said above array, said protector blocks being adapted for electrically conductive connection to subscriber lines, each of said predetermined number of subzones allowing jumper wires to be routed between a selected terminal of any one of said terminal blocks in said above array of each of said pairs and a selected terminal of any one of said terminal blocks in said below array of each of said pairs.

12. The modular distribution frame assembly of claim 11 wherein said frame other side includes at least one vertically upstanding channel upon which said protector blocks may be mounted.

13. The modular distribution frame assembly of claim 12 wherein one of the sides of said vertically upstanding channel includes means for routing said electrical connection between any one of said protector blocks and any one of said terminal blocks in said above array.

14. The modular distribution frame assembly of claim 13 wherein said protector blocks are mounted on said at least one vertically upstanding channel.

15. The modular distribution frame assembly of claim 11 wherein said frame includes at one end thereof a vertically upstanding member having a first channel opening to said frame one side, said predetermined number of horizontal channels opening to said first channel.

16. The modular distribution frame assembly of claim 15 wherein said vertically upstanding member includes a second channel opening to said frame other side, said second channel being back to back to said first channel.

17. The modular distribution frame assembly of claim 11 wherein said protector blocks are mounted in a vertical array which extends from the bottom to the top of said frame other side.

* * * * *